US010682908B1

(12) United States Patent
Taba

(10) Patent No.: US 10,682,908 B1
(45) Date of Patent: Jun. 16, 2020

(54) METHODS AND SYSTEMS FOR A FUEL SCAVENGE ARRANGEMENT

(71) Applicant: Ford Global Technologies, LLC, Dearborn, MI (US)

(72) Inventor: Anthony Taba, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/241,678

(22) Filed: Jan. 7, 2019

(51) Int. Cl.
*B60K 15/077* (2006.01)
*F02M 37/44* (2019.01)
*B60K 15/03* (2006.01)

(52) U.S. Cl.
CPC ......... *B60K 15/077* (2013.01); *F02M 37/44* (2019.01); *B60K 2015/03243* (2013.01)

(58) Field of Classification Search
CPC .... F02M 37/44; F02M 37/025; F02M 37/106; F02M 37/0023; F02M 37/0094; F02M 37/0058; F02M 37/0052; B60K 2015/03105; B60K 2015/03118; B60K 2015/03243; B60K 2015/03236
See application file for complete search history.

(56) References Cited

U.S. PATENT DOCUMENTS

| | | | |
|---|---|---|---|
| 5,078,169 A * | 1/1992 | Scheurenbrand | B60K 15/073 137/571 |
| 5,806,560 A | 9/1998 | Brown et al. | |
| 6,505,644 B2 | 1/2003 | Coha et al. | |
| 6,907,899 B2 | 6/2005 | Yu et al. | |
| 7,069,914 B2 * | 7/2006 | Nagata | F02M 37/025 123/509 |
| 7,950,374 B2 * | 5/2011 | Spittael | B63J 99/00 123/514 |
| 8,944,268 B2 | 2/2015 | Murabayashi et al. | |
| 9,468,876 B2 * | 10/2016 | Bornes | B01D 29/05 |
| 9,777,682 B2 | 10/2017 | Preston et al. | |
| 2003/0062031 A1 * | 4/2003 | Tanimura | F02M 37/44 123/510 |
| 2009/0085342 A1 * | 4/2009 | Chino | B60K 15/035 19 280/833 |
| 2016/0003113 A1 | 1/2016 | Claywell et al. | |

* cited by examiner

*Primary Examiner* — George C Jin
(74) *Attorney, Agent, or Firm* — Geoffrey Brumbaugh; McCoy Russell LLP

(57) ABSTRACT

Methods and systems are provided for a fuel tank comprising a scavenge pump. In one example, a system may include arranging a scavenge pump adjacent to a scavenge inlet, distal to a primary fuel delivery module. The arrangement may allow positive pressure from a fuel pump to force fuel back to the primary fuel delivery module during some vehicle conditions.

20 Claims, 4 Drawing Sheets

METHODS AND SYSTEMS FOR A FUEL SCAVENGE ARRANGEMENT

FIELD

The present description relates generally to a fuel scavenge arrangement comprising a fuel scavenge pump.

BACKGROUND/SUMMARY

Fuel tanks may comprise a variety of shapes and sizes to store fuel for combustion. However, as customer demands for greater driving ranges on a single fill-up continue to increase, so do fuel tank sizes. As such, the shape of the fuel tank may be adjusted to increase in size while also accommodating other vehicle components onboard the vehicle. Some example fuel tank shapes may include saddle-type, suitcase-type, and cigar type.

During some driving events where a vehicle is exposed to prolonged (e.g., 5 seconds or more) lateral accelerations, fuel in the fuel tank may be directed away from a primary fuel delivery module pick-up inlet. Current example approaches utilizing scavenge pumps may not be able to overcome the forces generated during the lateral acceleration to redirect the fuel back to the primary fuel delivery module pick-up inlet. This may cause loss of fuel pressure and engine power.

However, the inventors herein have recognized potential issues with such systems. As one example, the current example approaches rely solely on suction to pull fuel from other portions of the fuel tank to the primary fuel delivery module pick-up inlet. The suction generated during may be less than a suction desired to overcome a resistance pressure of the fuel due to the lateral acceleration, which may lead to insufficient fuel flow or a complete loss of fuel flow.

In one example, the issues described above may be addressed by a system comprising a fuel tank comprising a primary fuel delivery module comprising a fuel pump and a fuel pick-up inlet fluidly coupled to a fuel return conduit and a fuel feed conduit, and where the fuel feed conduit fluidly couples the fuel pump to a scavenge pump arranged directly adjacent to a scavenge inlet. In this way, suction losses between the scavenge pump and scavenge inlet may be eliminated and fuel flow may be reliable during vehicle conditions with high lateral pressures.

As one example, a distance between the scavenge pump and the scavenge inlet is decreased relative to arrangements in previous examples to decrease a pressure loss between the scavenge pump and scavenge inlet. In this way, fuel may be drawn into the scavenge inlet and fed to the primary fuel delivery module even during vehicle conditions where lateral pressures are relatively high. In one example, the fuel may be forced through a fuel return conduit via positive pressure generated by the fuel pump of the primary fuel delivery module in combination with suction generated by the scavenge pump. The two forces may gather fuel from a volume of the fuel tank distal to the primary fuel delivery module to return the fuel to the primary fuel delivery module during vehicle conditions where lateral forces are relatively high.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
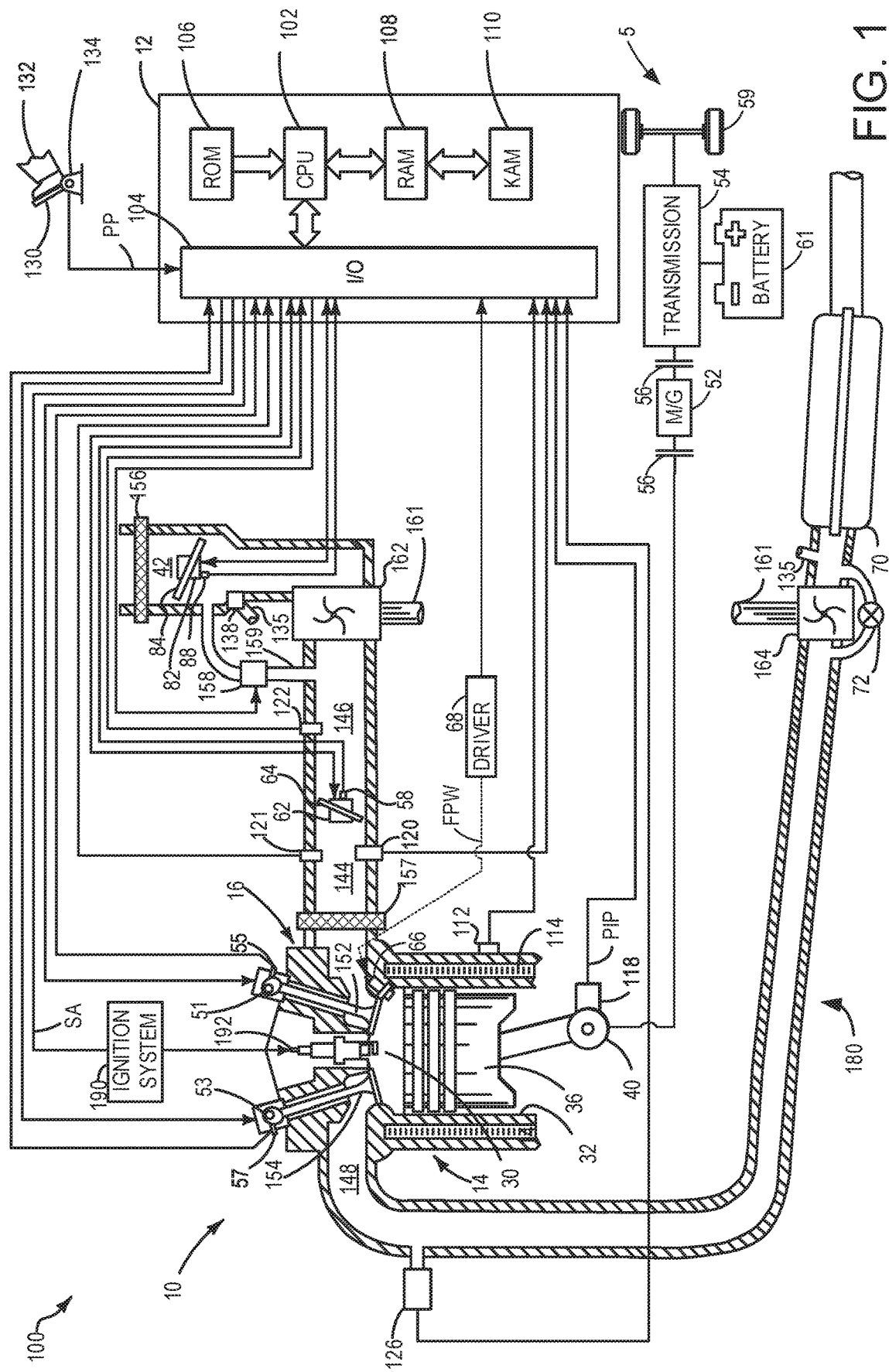
FIG. 1 illustrates a schematic of an engine included in a hybrid vehicle.

The following description relates to systems and methods for a fuel tank comprising a fuel scavenge pump. The fuel scavenge pump may be arranged to increase retrieval of fuel displaced to a portion of a fuel tank distal to a primary fuel delivery module. FIG. 1 illustrates a schematic of a vehicle, which may be a hybrid vehicle. The engine may receive fuel from a fuel injector fluidly coupled to a fuel rail, the fuel rail receiving fuel from a fuel tank, such as the fuel tank shown in FIG. 2.

During some vehicle operating conditions, fuel in the fuel tank may move. This movement may result in the fuel moving away from a primary fuel delivery module of the fuel tank, wherein the primary fuel delivery module may supply fuel to the fuel rail to later be injected into a combustion chamber of the engine. A device for retrieving fuel away from the primary fuel delivery may be a scavenge pump. In previous examples of fuel tanks, the scavenge pump is arranged within an architecture of the primary fuel delivery module and its inlet is arranged in a portion of the fuel tank distal to the primary fuel delivery module. Fuel may flow from the inlet, through a conduit, and to the scavenge pump via a suction generated by the scavenge pump, where the fuel is fed to the primary fuel delivery module. However, during some vehicle operations with a relatively high lateral acceleration, such as cornering, a force of the lateral acceleration may move fuel to the portion of the fuel tank away from the primary fuel delivery module. If the force is high enough, the suction created by the scavenge pump may be insufficient to draw the fuel back to the primary fuel delivery module. In this way, previous examples of fuel tank arrangements with the scavenge pump arranged in the primary fuel delivery module may result in a decrease of fuel flow during some vehicle operations.

Figure 2:
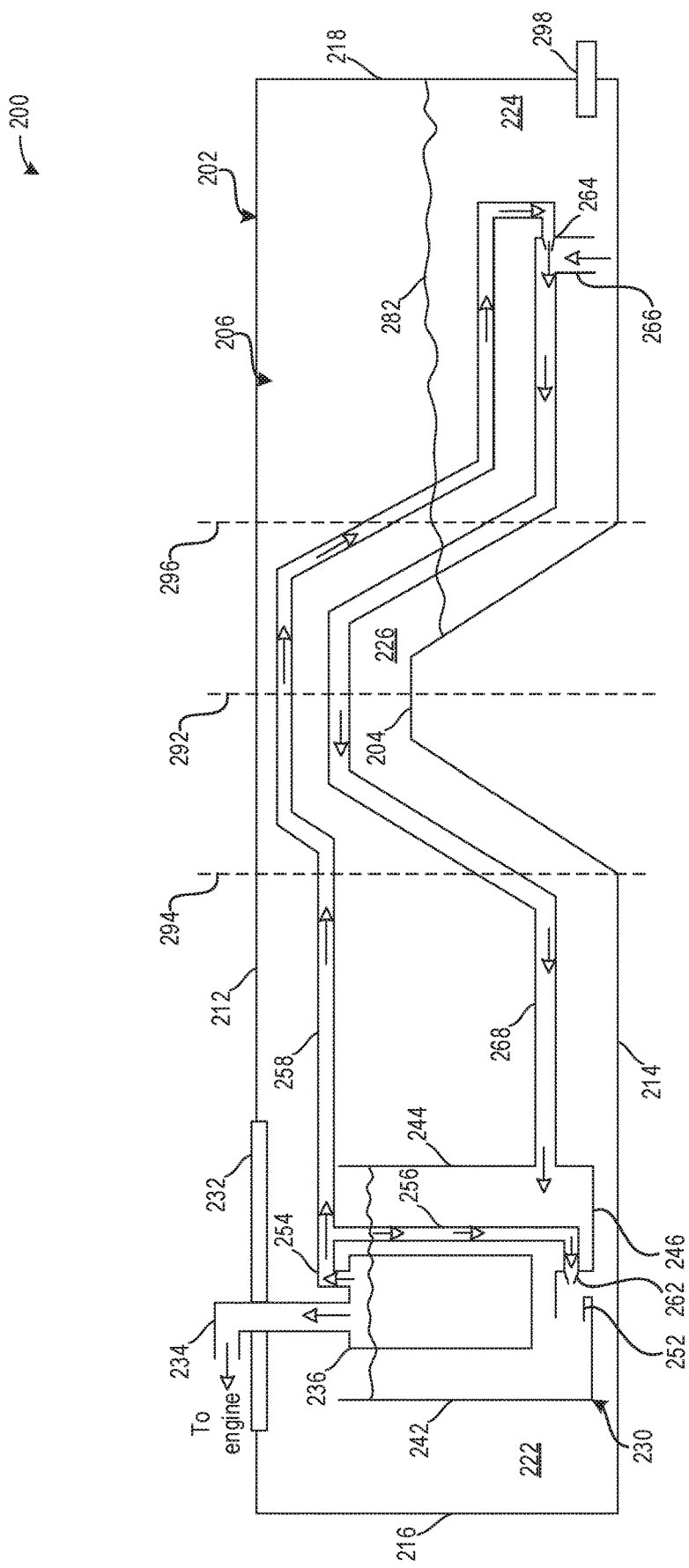
FIG. 2 illustrates a schematic of a fuel tank comprising a fuel scavenge pump.

The fuel tank of FIG. 2 may alleviate the above described issues. The scavenge pump may be arranged outside of the primary fuel delivery module. In the example of FIG. 2, the primary pump may be arranged adjacent to the scavenge inlet. In this way, a fuel pump may force fuel into the scavenge pump, which may create enough pressure to force fuel through the scavenge pump. The scavenge pump may comprise a venturi shape, wherein the suction generated by the scavenge pump along with the pressure of the fuel pumped by the fuel pump promotes retrieval of fuel that has moved away from the primary fuel module. The fuel may be returned to the primary fuel module and delivered to the engine.

Figure 3:
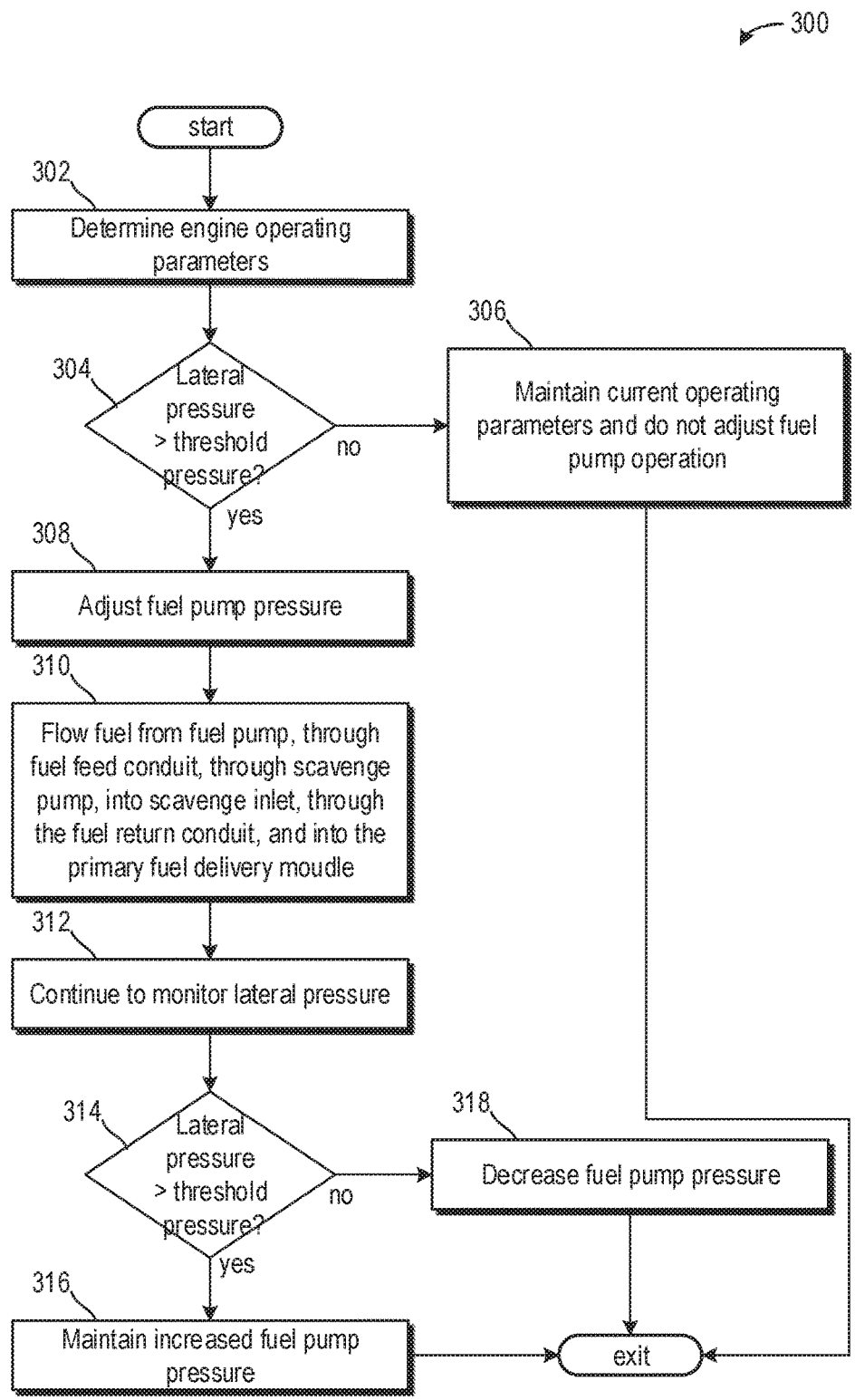
FIG. 3 illustrates a method for operating one or more pumps of the fuel tank.
Figure 4:
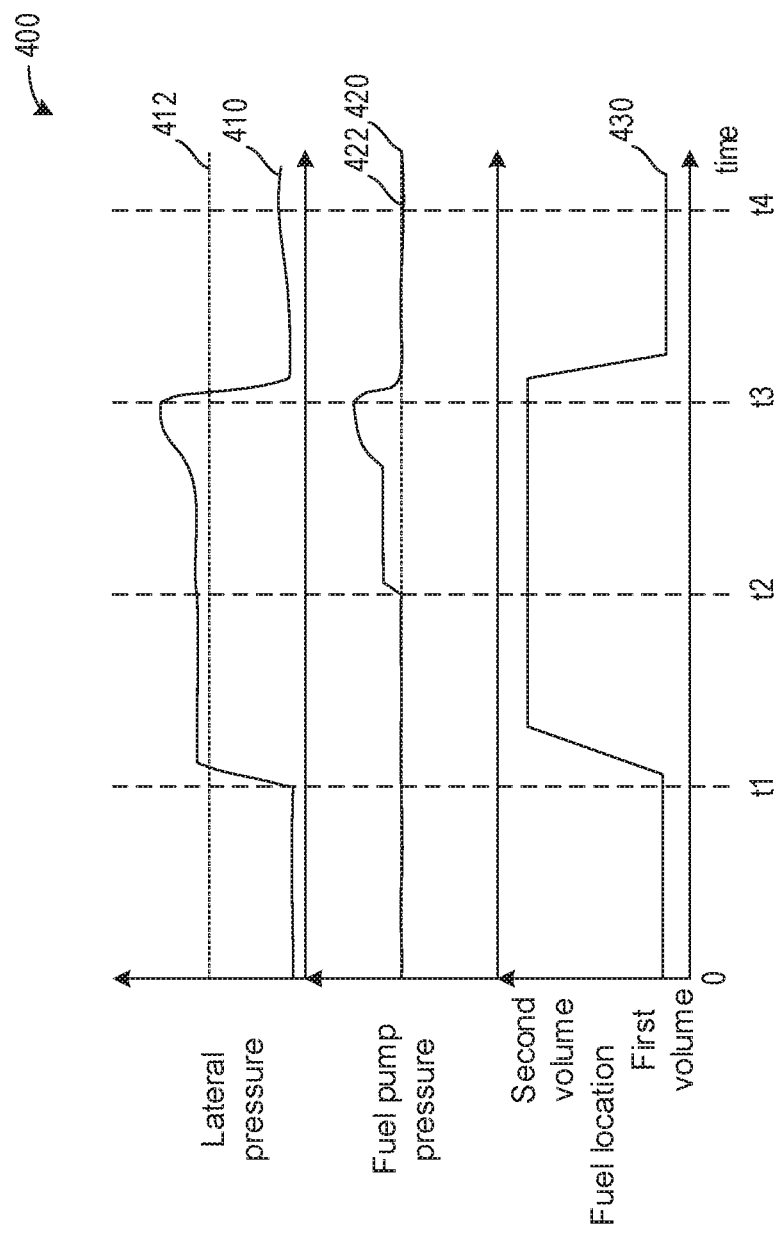
FIG. 4 illustrates an engine operating sequence graphically displaying various engine operating parameters during different vehicle conditions.

FIG. 3 shows a method for adjusting fuel pump operation in response to vehicle conditions where fuel may move away from the primary fuel module. FIG. 4 illustrates an engine operating sequence graphically displaying vehicle conditions including adjustments to fuel tank operations based on changing vehicle conditions.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Note that FIG. 2 shows arrows indicating where there is space for gas to flow, and the solid lines of the device walls show where flow is blocked and communication is not possible due to the lack of fluidic communication created by the device walls spanning from one point to another. The walls create separation between regions, except for openings in the wall which allow for the described fluid communication.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 12 receives signals from the various sensors of FIG. 1 and employs the various actuators of FIG. 1 to adjust engine operation based on the received signals and instructions stored on a memory of the controller. For example, adjusting operation of the electric machine 52 may occur based on feedback from ECT sensor 112. As will be described in greater detail below, the engine 10 and electric machine 52 may be adjusted such that their operations may be delayed based on one or more of a powertrain temperature, which may be estimated based on feedback from ECT sensor 112, and a distance between an intended destination and an electric-only operation range.

Turning now to FIG. 2, it shows an embodiment of a fuel tank 200. The fuel tank 200 may be shaped to house fuel. In one example, the fuel may be a liquid fuel, such as gasoline. However, it will be appreciated that the fuel tank 200 may house a fuel other than gasoline, such as diesel, alcohol, compressed natural gas, and the like. Additionally or alternatively, the fuel tank 200 may comprise a mixture of fuels, such as gasoline and alcohol.

The fuel tank 200 may comprise a shell 202 which may comprise a material innocuous to fuel. In one example, the shell 202 is plastic. Additionally or alternatively, the material of the shell 202 may be resistant to expansion and retractions due to temperature fluctuations.

The shell 202 may be shaped to be arranged around one or more vehicle components arranged in a vehicle underbody. In the example of FIG. 2, the shell 202 comprises a saddle-shape. That is to say, the shell 202 may comprise a hump 204. The hump 204 may protrude into an interior volume 206 of the fuel tank 200, which is defined by surfaces of the shell. More specifically, the shell 202 may comprise a top surface 212, a bottom surface 214, a first side surface 216, and a second side surface 218. The top surface 212 and bottom surface 214 may be physically coupled to opposite extreme ends of the first and second side surfaces 216, 218. The hump 204 may extend from the bottom surface 214 such that the bottom surface 214 may be the only non-linear surface of the shell 202. A central axis 292 may extend through an apex of the hump 204. In one example, the hump 204 may be biased toward one of the first or second side surfaces 216, 218 such that the shell is asymmetric. Additionally or alternatively, the hump 204 may not be biased toward one of the first or second side surfaces 216, 218 such that the shell 202 is symmetric. In some examples, additionally or alternatively, the shell 202 may be shaped such that the fuel tank is a suitcase-type or cigar type.

The fuel tank 200 may comprise a first volume 222 on a first side of the hump 204, and a second volume 224 on a second side of the hump 204. More specifically, the first volume 222 may be arranged between a first dashed line 294 and the first side surface 216. The second volume may be arranged between a second dashed line 296 and the second side surface 218. A third volume 226 may be arranged between each of the first and second dashed lines 294, 296. The third volume 226 may be smaller than each of the first and second volumes 222, 224, wherein the third volume 216 may be further arranged between the top surface 212 and the hump 204.

It will be appreciated that the interior volume 206, which comprises each of the first volume 222, the second volume 224, and the third volume 226 may be a single continuous volume. However, as described above, certain vehicle operating conditions may result in the first volume 222, the second volume 224, and the third volume 226 becoming more distinct volumes such that fuel may not readily flow therebetween. One example of such a vehicle maneuver may include cornering wherein a lateral force generated forces fuel from the first volume 222 to flow around the hump 204 and through the third volume 226 to the second volume 224, wherein the lateral force may prevent fuel from returning from the second volume to the first volume. In the present example of FIG. 2, a vehicle may be cornering or performing some other maneuver where lateral forces are sufficient to move the fuel to the second volume 224, where fuel in the second volume 224 is illustrated via curvy line 282.

A pressure sensor 298 may be fixedly arranged in the second side surface 218. The pressure sensor 298 may be physically coupled to the second side surface 218 via a boss or other coupling device. The pressure sensor 298 may sense a pressure of fuel in the second volume 224 of the fuel tank 202 resulting from vehicle driving, location, and the like. As shown, the pressure sensor 298 may be arranged at a portion of the second side surface 218 proximal to the bottom surface 214 and distal to the top surface 212 so that lower fuel level pressures may be measured. The pressure sensor 298 may provide feedback to a controller (e.g., controller 12 of FIG. 1), wherein adjustments to a pressure of a fuel pump may be based on the feedback, as described below.

To decrease packaging constraints, the fuel tank 200 may comprise only one primary fuel delivery module 230. The primary fuel delivery module 230 may be suspended in the interior volume 206 of the fuel tank 200 via a flange 232. The flange 232 may be embedded and/or integrated into the shell 202 wherein a thickness of the flange 232 may be greater than a thickness of the shell 202. Additionally or alternatively, the flange 232 may comprise a material similar to a material of the shell 202.

A fuel feed port 234 may extend through a cut-out of the flange 232 into the interior volume 206 of the fuel tank 200 to the primary fuel module 230. The fuel feed port 234 may be directly fluidly coupled to a fuel pump 236. The fuel pump 236 may be arranged within surfaces of the primary fuel delivery module 230, where the surfaces include a first side surface 242, a second side surface 244, and a bottom surface 246. As such, the fuel feed port 234 may be included as a component in the primary fuel module 230. In one example, the primary fuel delivery module 230 may comprise a cylindrical shape, wherein the cylinder is free of a top such that the cylinder is open at one extreme end.

The bottom surface 246 may comprise a primary fuel delivery module pick-up inlet 252. The primary fuel delivery module pick-up inlet 252 may be shaped to receive fuel arranged between the bottom surface 246 and the bottom surface 214.

More specifically, the fuel pump 236 may pump fuel (shown by white head arrows), where a portion of the fuel may be directed through the fuel feed port 234 and sent to an engine. Another portion of the fuel may be delivered to a fuel feed hose 254, which may bifurcate to form a first conduit 256 and a second conduit 258. The first conduit 256 may receive fuel from the fuel feed hose 254, wherein the fuel is directed to a primary fuel delivery module pick-up inlet pump 262. The primary fuel delivery module pick-up inlet pump 262 may comprise a venturi feature that enables the primary fuel delivery module pick-up inlet 252 to draw fuel from a region between the bottom surface 246 and the bottom surface 214 and transport the fuel in to the primary fuel delivery module 230 to be pumped by the fuel pump 230. However, in the example of FIG. 2, there is insufficient fuel in the region between the bottom surface 246 and the bottom surface 214 for the primary fuel delivery module pick-up inlet 252 to draw.

Another portion of the fuel may flow through the second conduit 258, which may be closer to the top surface 212 than the bottom surface 214. Unlike the first conduit 256 which extends only within the boundaries of the primary fuel delivery module 230 in the first volume 222, the second conduit 258 extends away from the primary fuel delivery module 230, through the first volume 222, through the third volume 226, and into the second volume 224. The second conduit 258 may comprise a shape similar to the bottom surface 214 (including the hump 204). The second conduit 258 may direct fuel from the fuel pump 236 to a scavenge pump 264.

As shown, the scavenge pump 264 is arranged outside of the primary fuel delivery module 230. In one example, the scavenge pump 264 is arranged adjacent to a scavenge inlet 266. The scavenge inlet 266 may be shaped to admit fuel that is located in the second volume 224 of the fuel tank 200. In one example, the scavenge pump 264 is arranged within a threshold distance of the scavenge inlet 266. The threshold distance may be based on a distance such that the scavenge pump 264 is as close to the scavenge inlet 266 as possible. In one example, the threshold distance is less than twelve inches from an opening and/or extreme end of the scavenge inlet 266 through which fuel from the second volume 224 may flow. In another example, the threshold distance is less than ten inches away from the opening and/or extreme end of the scavenge inlet 266. In one example, the threshold distance is six inches. In one example, the scavenge pump 264 is arranged at an intersection between the scavenge inlet 266 and a fuel return conduit 268 in the second volume 224. The fuel return conduit 268 may be arranged between the bottom surface 214 and the second conduit 258.

The scavenge pump 264 may be shaped similarly to the primary fuel delivery module pick-up inlet pump 262. As such, a suction may be generated as fuel flows through the scavenge pump 264, from the fuel feed conduit 254, and into the scavenge inlet 266. The suction may assist in drawing fuel in the fuel return conduit 268. The fuel return conduit 268 may be fluidly coupled to each of the scavenge inlet 266 and the scavenge pump 264. Additionally, the fuel return conduit 268 may direct fuel from the second volume 224 to the primary fuel delivery module 230 in the first volume 222.

Pressure from the fuel in the second conduit 258, which may be a continuation of the fuel feed conduit 254, may force fuel in the fuel return conduit 268 to flow to the primary fuel delivery module 230. The pressure may be generated by the fuel pump 236 as it forces fuel through the fuel feed conduit 254. The pressure of the fuel being greater than a pressure of fuel filled into the fuel return conduit 268 due to fuel moving to the second volume 224. As such, fuel scavenging may no longer be solely dependent on suction generated at the scavenge pump 264. Thus, the arrangement shown in FIG. 2 may utilize positive pressure from the fuel pump and the scavenge pump to return fuel to the primary fuel delivery module.

In one example, the scavenge pump 264 may be continuously operating to pump fuel from the second volume 224 to the primary fuel delivery module 230 via negative pressure. During vehicle conditions where fuel is arranged only in the first volume 222, the scavenge pump 264 may direct fuel vapors from the second volume 224 to the primary fuel delivery module 230 via negative pressure. These fuel vapors may escape from the interior volume of the primary fuel delivery module 230, the interior volume defined by surfaces of the primary fuel delivery module 230 described above. However, during conditions where vehicle maneuvers or a road topography forces fuel to flow to the second volume 224, the scavenge pump 264 along with assistance from the fuel pump 236, begins to flow liquid fuel from the second volume 224 to the primary fuel delivery module 230 via positive pressure, rather than negative pressure.

Turning now to FIG. 3, it shows a method for adjusting fuel pump operation in response to vehicle conditions. Instructions for carrying out method 300 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 300 begins at 302, which includes determining, estimating, and/or measuring current engine operating parameters. The current engine operating parameters may include one or more of throttle position, manifold vacuum, engine speed, engine load, engine temperature, vehicle speed, EGR flow rate, and air/fuel ratio.

The method 300 proceeds to 304, which includes determining if a lateral pressure is greater than a threshold pressure. The lateral pressure may be measured via a pressure sensor of the fuel tank, such as pressure sensor 298 of FIG. 2. Additionally or alternatively, the lateral pressure may be approximated via a gyroscope or other device arranged on the vehicle (e.g., a navigation system which may correlate lateral pressures generated to a current route traveled). The lateral pressure may be greater than the threshold pressure if the vehicle is cornering or performing another vehicle maneuver where the vehicle is not driving in a linear path on flat ground. In such an example, fuel in the fuel tank may move (e.g., slosh) away from a primary fuel delivery module (e.g., primary fuel delivery module 230 of FIG. 2) and into a separate portion of the fuel tank so that fuel is no longer in contact with the primary fuel delivery module. As such, a scavenge pump may be relied upon to draw fuel into the scavenge inlet and so the pressure generated by the fuel pump may push fuel through the fuel return hose and back to the primary fuel delivery module.

In some examples, additionally or alternatively, the method may further include determining if the lateral pressure will be greater than the threshold pressure for greater than a threshold duration. The threshold duration may be greater than three seconds in some examples. In other examples, additionally or alternatively, the threshold duration is five seconds. In one example, the threshold duration is exactly seven seconds. In this way, the fuel pump operation may be adjusted in response to the lateral pressure being greater than the threshold pressure for greater than the threshold duration.

The lateral pressure may be estimated based on vehicle operating conditions, including steering wheel position and the like. Additionally or alternatively, pressure sensors may be used to send feedback to a controller, such as controller 12 of FIG. 1, regarding a lateral pressure. Additionally or alternatively, a GPS and/or navigation device may be used to determine a vehicle location, wherein the vehicle location, in combination with a vehicle speed may be used to calculate the lateral pressure.

If the lateral pressure is less than or equal to the threshold pressure, then the method 300 proceeds to 306, which may include maintaining current engine operating parameters. This may further include not adjusting the fuel pump operation. In this way, the fuel may be in contact with the primary fuel delivery module such that the scavenge pump may not be relied upon to retrieve fuel in the fuel tank.

If the lateral pressure is greater than the threshold pressure, then the method 300 may proceed to 308, which may include adjusting the fuel pump pressure. In one example, the fuel pump pressure is increased to overcome the lateral pressure to assist the scavenge pump in drawing fuel from the second volume of the fuel tank back to the primary fuel delivery module. In some examples, an amount in which the fuel pump pressure is increased may be proportional to a difference between the lateral pressure and the threshold pressure. For example, as the difference between the lateral pressure and the threshold pressure increases, the amount in which the fuel pump pressure is increased also increases. In one example, the adjusting the fuel pump pressure may include adjusting the fuel pump pressure to a pressure greater than a pressure provided by feedback from the pressure sensor arranged in the fuel tank (e.g., pressure sensor 298 of FIG. 2).

The method 300 may proceed to 310, which may include flowing fuel from the fuel pump, through the fuel feed conduit, through the scavenge pump, into a scavenge inlet, through the fuel return conduit, and into the primary fuel delivery module. As described above, unlike previous examples, positive pressure from the fuel pump may drive the flow of fuel through the fuel return conduit and back to the primary fuel delivery module. In one example, the scavenge pump may assist in drawing some amount of fuel into the scavenge inlet and the fuel return conduit, however, suction of the scavenge pump may not be relied upon as the sole contributor in directing fuel to flow to the primary fuel delivery module.

The method 300 may proceed to 312, which may include continuing to monitor the lateral pressure.

The method 300 may proceed to 314 to determine if the lateral pressure is still greater than the threshold pressure. If the lateral pressure is still greater than the threshold pressure, then the method 300 may proceed to 316 to maintain the increased fuel pump pressure. The fuel pump pressure may be maintained at the increased pressure until the lateral pressure is no longer greater than the threshold pressure.

If the lateral pressure is less than or equal to the threshold pressure, then the method 300 may proceed to 318 to decrease the fuel pump pressure back to a normal operating pressure, wherein the normal operating pressure corresponds to a pressure of the fuel pump when the lateral pressure is less than or equal to the threshold pressure.

Turning now to FIG. 4, it shows a plot 400 graphically displaying an engine operating sequence, which includes a plot 410 displaying a lateral pressure and dashed line 412 illustrating a threshold pressure, a plot 420 displaying a fuel pump pressure and a dashed line 422 illustrating a normal fuel pump pressure, and a plot 430 illustrating a fuel location. As described above, the normal fuel pump pressure may be substantially equal to a fuel pump pressure used when the lateral pressure is less than or equal to the threshold pressure. The threshold pressure may correspond to a lateral pressure that forces fuel to move away from a primary fuel delivery module to a different end of a fuel tank, wherein the different end is distal to the primary fuel delivery module such that fuel may no longer be in contact with a primary fuel delivery module pick-up inlet. Time increases from a left side to a right side of the figure.

Prior to t1, the lateral pressure (plot 410) is equal to a pressure less than the threshold pressure. As such, the fuel pump pressure (plot 420) may be substantially equal to a normal fuel pump pressure (dashed line 422). As shown, the fuel pump pressure may track the normal fuel pump pressure such that the normal fuel pump pressure may be occluded when the two are substantially equal. Furthermore, the fuel may be arranged in the first volume (plot 430) where the fuel may be in contact with the primary fuel delivery module pick-up inlet, where a suction created by the primary fuel delivery module pick-up inlet pump may be sufficient to draw fuel in to the primary fuel delivery module. At t1, the lateral pressure may begin to increase.

Between t1 and t2, the lateral pressure continues to increase and increases to a pressure greater than the threshold pressure. As the lateral pressure increases, the fuel may move from the first volume of the fuel tank to the second volume of the fuel tank. However, the fuel pump pressure may not be increased as the primary fuel delivery module may still comprise a store of fuel unaffected by the lateral pressure. At t2, the lateral pressure remains greater than the threshold pressure. Additionally, fuel in the primary fuel delivery module may be relatively low such that the fuel pump may no longer be able to pump fuel to the fuel rail of the engine.

In one example, a threshold duration has elapsed from when the lateral pressure exceeded the threshold duration to t2. During the threshold duration, fuel in the primary fuel delivery module was consumed, however, since the lateral pressure remains greater than the threshold pressure, a likelihood of fuel flow to the engine decreasing or stopping is increased. In this way, the threshold duration may be based on an amount of fuel stored in the primary fuel delivery module prior to the lateral acceleration exceeding the threshold pressure, wherein once the threshold duration has elapsed, the primary fuel delivery module may be low or out of fuel. By waiting for the threshold duration to elapse before increasing the fuel pump pressure, a fuel efficiency of the vehicle may be increased.

Between t2 and t3, the fuel pump pressure is increased to a pressure above the normal fuel pump pressure. Furthermore, the fuel pump pressure increases proportionally to the lateral pressure as the lateral pressure increases further above the threshold pressure. Fuel from the second volume may be directed to the primary fuel delivery module such that the fuel pump may pump fuel to the fuel rail of the engine. At t3, the lateral pressure begins to decrease.

Between t3 and t4, the lateral pressure decreases to a pressure less than the threshold pressure. As such, fuel may move back to the first volume and the fuel pump pressure may decrease to a pressure substantially equal to the normal fuel pump pressure. At t4 and after, the fuel pump pressure remains equal to the normal fuel pump pressure such the primary fuel delivery module pick-up inlet pump may be a primary source for directing fuel into the primary fuel delivery module.

In this way, a fuel tank may comprise a primary fuel delivery module and a scavenge pump located distal to the primary fuel delivery module. The scavenge pump, in combination with a fuel pump of the primary fuel delivery may force fuel that has moved away from the primary fuel delivery module to flow back to the primary fuel delivery module. The technical effect of arranging the scavenge pump away from the primary fuel delivery module is to arrange it proximally to a scavenge inlet, which may decrease pressure losses. By doing this, during some vehicle conditions where lateral pressures may be high, such as cornering, fuel distal to the primary fuel delivery module may be delivered thereto as pressure losses are minimized.

In another representation, an embodiment of a system comprises a fuel tank comprising a primary fuel delivery module comprising a fuel pump and a fuel pick-up inlet fluidly coupled to a fuel return conduit and a fuel feed conduit, and where the fuel feed conduit fluidly couples the fuel pump to a scavenge pump arranged directly adjacent to a scavenge inlet. A first example of the system further includes where the scavenge pump and the scavenge inlet are arranged distally to the primary fuel delivery module. A second example of the system, optionally including the first example, further includes where the fuel feed conduit bifurcates into a first conduit fluidly coupled to a primary fuel delivery module pick-up inlet pump and a second conduit fluidly coupled to the scavenge pump, wherein the second conduit is longer than the first conduit. A third example of the system, optionally including the first and/or second examples, further includes where the primary fuel delivery module is arranged adjacent to a first side wall of the fuel tank, and where the scavenge pump is arranged adjacent to a second side wall of the fuel tank, the first side wall separated from the second side wall by a length of the fuel tank. A fourth example of the system, optionally including one or more of the first through third examples, further includes where the scavenge pump and the scavenge inlet are located proximally to a bottom wall of the fuel tank. A fifth example of the system, optionally including one or more of the first through fourth examples, further includes where fuel from the fuel pump flows through the scavenge pump before entering the scavenge inlet. A sixth example of the system, optionally including one or more of the first through fifth examples, further includes where a suction is generated as fuel flows through the scavenge pump.

In another representation, an embodiment of an engine system comprises a fuel tank comprising a primary fuel delivery module arranged in a first volume of the fuel tank, and where a scavenge pump and scavenge inlet are arranged in a second volume of the fuel tank and a controller with computer-readable instructions stored on non-transitory memory thereof that when executed enable the controller to adjust a fuel pump pressure in response to a comparison between a lateral pressure and a threshold pressure. A first example of the engine system further comprises where the first volume and the second volume are separated by a hump protruding from a bottom surface of the fuel tank into an interior volume of the fuel tank. A second example of the engine system, optionally including the first example, further comprises where the scavenge pump is arranged at a transition between a fuel return conduit and the scavenge inlet, wherein the fuel return conduit directs fuel to the primary fuel delivery module. A third example of the engine system, optionally including the first and/or second examples, further comprises where fuel in the fuel return conduit flows to the primary fuel delivery module via positive pressure. A fourth example of the engine system, optionally including one or more of the first through third examples, further comprises where the primary fuel delivery module comprises a fuel pump configured to pump fuel through a fuel feed port to an engine, the fuel pump further configured to pump fuel through a fuel feed conduit, wherein the fuel feed conduit bifurcates into a first conduit fluidly coupled to a primary fuel delivery module pick-up inlet pump arranged in the primary fuel delivery module and a second conduit fluidly coupled to the scavenge pump arranged outside the primary fuel delivery module. A fifth example of the engine system, optionally including one or more of the first through fourth examples, further comprises where the primary fuel delivery module pick-up inlet pump and the scavenge pump are identical. A sixth example of the engine system, optionally including one or more of the first through fifth examples, further comprises where the instructions further enable the controller to increase the fuel pump pressure in response to the lateral pressure being greater than the threshold pressure. A seventh example of the engine system, optionally including one or more of the first through sixth examples, further comprises where the instructions increase the fuel pump pressure in response to the lateral pressure being greater than the threshold pressure for greater than a threshold duration.

In another representation, a further embodiment of a system comprises a fuel tank comprising a top surface, a bottom surface, a first side surface, and a second side surface, a primary fuel delivery module suspended in an interior volume of the fuel tank via a primary fuel delivery module flange arranged in the top surface, the primary fuel delivery module arranged in a volume of the fuel tank adjacent to the first side surface, wherein the primary fuel delivery module comprises a fuel pump shaped to pump fuel to an engine, to a primary fuel delivery module pick-up inlet pump, and to a scavenge pump and a scavenge inlet fluidly coupled to a fuel return conduit adjacent to the second side surface, wherein the scavenge pump is arranged at an intersection between the scavenge inlet and the fuel return conduit. A first example of the system further includes where the fuel tank is a saddle-shaped fuel tank, and where a hump of the fuel tank extends from the bottom surface into the interior volume of the fuel tank between the first side surface and the second side surface, wherein a first volume of the interior volume corresponds to an area of the fuel tank between the first side surface and the hump, and where a second volume of the interior volume corresponds to an area of the fuel tank between the second side surface and the hump, and where a third volume is arranged between the first volume and the second volume, the third volume corresponding to an area of the interior volume between the hump and the top surface. A second example of the system, optionally including the first example, further includes where the scavenge pump draws fuel from the second volume of the fuel tank following receiving fuel from the fuel pump. A third example of the system, optionally including the first and/or second examples, further includes where the scavenge pump receives fuel from the fuel pump via a bifurcation of a fuel feed conduit, a first conduit of the bifurcation directs fuel to the primary fuel delivery module pick-up inlet pump and a second conduit of the bifurcation directs fuel to the scavenge pump, wherein fuel in the first conduit does not mix with fuel in the second conduit. A fourth example of the system, optionally including one or more of the first through third examples, further includes where the second conduit traverses each of the first volume, second volume, and third volume.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
a fuel tank comprising a primary fuel delivery module comprising a fuel pump and a fuel feed port and a fuel pick-up inlet fluidly coupled to a fuel return conduit and a fuel feed conduit, where the fuel feed conduit fluidly couples the fuel pump to a scavenge pump arranged directly adjacent to a scavenge inlet.

2. The system of claim 1, wherein the scavenge pump and the scavenge inlet are arranged distally to the primary fuel delivery module.

3. The system of claim 1, wherein the fuel feed conduit bifurcates into a first conduit fluidly coupled to a primary fuel delivery module pick-up inlet pump and a second conduit fluidly coupled to the scavenge pump, wherein the second conduit is longer than the first conduit.

4. The system of claim 1, wherein the primary fuel delivery module is arranged adjacent to a first side wall of the fuel tank, and where the scavenge pump is arranged adjacent to a second side wall of the fuel tank, the first side wall separated from the second side wall by a length of the fuel tank.

5. The system of claim 1, wherein the scavenge pump and the scavenge inlet are located proximally to a bottom wall of the fuel tank.

6. The system of claim 1, wherein fuel from the fuel pump flows through the scavenge pump before entering the scavenge inlet.

7. The system of claim 6, wherein a suction is generated as fuel flows through the scavenge pump.

8. An engine system comprising:
a fuel tank comprising a primary fuel delivery module arranged in a first volume of the fuel tank, and where a scavenge pump and scavenge inlet are arranged in a second volume of the fuel tank; and
a controller with computer-readable instructions stored on non-transitory memory thereof that when executed enable the controller to:
adjust a fuel pump pressure in response to a comparison between a lateral pressure and a threshold pressure.

9. The engine system of claim 8, wherein the first volume and the second volume are separated by a hump protruding from a bottom surface of the fuel tank into an interior volume of the fuel tank.

10. The engine system of claim 8, wherein the scavenge pump is arranged at a transition between a fuel return conduit and the scavenge inlet, wherein the fuel return conduit directs fuel to the primary fuel delivery module.

11. The engine system of claim 8, wherein fuel in the fuel return conduit flows to the primary fuel delivery module via positive pressure.

12. The engine system of claim 8, wherein the primary fuel delivery module comprises a fuel pump configured to pump fuel through a fuel feed port to an engine, the fuel pump further configured to pump fuel through a fuel feed conduit, wherein the fuel feed conduit bifurcates into a first conduit fluidly coupled to a primary fuel delivery module pick-up inlet pump arranged in the primary fuel delivery module and a second conduit fluidly coupled to the scavenge pump arranged outside the primary fuel delivery module.

13. The engine system of claim 12, wherein the primary fuel delivery module pick-up inlet pump and the scavenge pump are identical.

14. The engine system of claim 8, wherein the instructions further enable the controller to increase the fuel pump pressure in response to the lateral pressure being greater than the threshold pressure.

15. The engine system of claim 8, further comprising where the instructions increase the fuel pump pressure in response to the lateral pressure being greater than the threshold pressure for greater than a threshold duration.

16. A system comprising:
a fuel tank comprising a top surface, a bottom surface, a first side surface, and a second side surface;
a primary fuel delivery module suspended in an interior volume of the fuel tank via a primary fuel delivery module flange arranged in the top surface, the primary fuel delivery module arranged in a volume of the fuel tank adjacent to the first side surface, wherein the primary fuel delivery module comprises a fuel pump shaped to pump fuel to an engine, to a primary fuel delivery module pick-up inlet pump, and to a scavenge pump; and
a scavenge inlet fluidly coupled to a fuel return conduit adjacent to the second side surface, wherein the scavenge pump is arranged at an intersection between the scavenge inlet and the fuel return conduit.

17. The system of claim 16, wherein the fuel tank is a saddle-shaped fuel tank, and where a hump of the fuel tank extends from the bottom surface into the interior volume of the fuel tank between the first side surface and the second side surface, wherein a first volume of the interior volume corresponds to an area of the fuel tank between the first side surface and the hump, and where a second volume of the interior volume corresponds to an area of the fuel tank between the second side surface and the hump, and where a third volume is arranged between the first volume and the second volume, the third volume corresponding to an area of the interior volume between the hump and the top surface.

18. The system of claim 17, wherein the scavenge pump draws fuel from the second volume of the fuel tank following receiving fuel from the fuel pump.

19. The system of claim 18, wherein the scavenge pump receives fuel from the fuel pump via a bifurcation of a fuel feed conduit, a first conduit of the bifurcation directs fuel to the primary fuel delivery module pick-up inlet pump and a second conduit of the bifurcation directs fuel to the scavenge pump, wherein fuel in the first conduit does not mix with fuel in the second conduit.

20. The system of claim 19, wherein the second conduit traverses each of the first volume, second volume, and third volume.

* * * * *